United States Patent Office 3,510,435
Patented May 5, 1970

3,510,435
METHOD OF PRODUCING OPAQUE
ENCAPSULATED MATERIALS
Gloria F. Sirine, Palo Alto, Calif., assignor, by mesne assignments, to The National Cash Register Company, Dayton, Ohio, a corporation of Maryland
No Drawing. Filed Nov. 17, 1967, Ser. No. 683,805
Int. Cl. B01j *13/02*
U.S. Cl. 252—316
9 Claims

ABSTRACT OF THE DISCLOSURE

This invention relates to a technique of encapsulating water-insoluble materials by coacervation, wherein an aqueous solution of a negative polymer and a positive polymer is prepared, the water-insoluble material is dispersed in the solution and the system is caused to form a coacervate which encapsulates the particles or droplets of dispersed material. The dispersed material becomes the internal phase of the capsules. This technique is modified in accordance with the invention to render the capsule walls opaque to protect the internal phase from sunlight or to conceal the internal phase. This is done by incorporating carbon black in the walls of the capsules under conditions such that an adequate amount of carbon black is dispersed in the capsule walls in highly dispersed condition, and such that the walls are made opaque, such being accomplished without interference with the coacervation-encapsulation process and without detriment to the capsule walls.

---

This invention relates to the encapsulation of liquids and/or solids by the technique of coacervation.

The technique of coacervation to encapsulate materials is well known and is described, for example, in Green and Schleicher U.S. Pat. 2,800,457 (hereinafter referred to as the "Green patent"). By this means various substances such as volatile solvents, insoluble or slightly soluble solids, oil solutions of dyes, etc. may be encapsulated and protected by providing an aqueous solution wherein two colloids or polymers are dissolved which have electric charges of opposite sign, dispersing the substance to be encapsulated in the solution (either during the preparation of the solution or after it has been prepared), then modifying the solution as by adjusting the pH, diluting it or reducing the temperature to bring about coacervation of the two colloids or polymers. The coacervate forms walls about and encapsulates the dispersed particles or droplets. By this means such useful products as encapsulated dyes for use in so-called carbonless carbon paper and many other products may be prepared.

The walls of such capsules are ordinarily translucent if not transparent, and they are pervious to sunlight and to other forms of radiation. In some cases it may be desired to conceal the color of the internal phase (the encapsulated core) or it may be desired to protect the internal phase from degradation by exposure to sunlight.

Heretofore, it has been very difficult to provide satisfactory opaque walls of such capsules. Efforts to incorporate a pigment in the encapsulating medium during encapsulation have been unavailing or unsatisfactory. Application of pigment to the capsules after they have been formed has also been difficult and has given unsatisfactory results.

It is an object of the present invention to provide a method for rendering opaque the otherwise translucent or light pervious walls of capsules of the character described, whereby the internal phase or core material is concealed and/or is protected from the damaging effects of sunlight and similar radiation.

The above and other objects of the invention will be apparent from the ensuing description and the appended claims.

In accordance with the present invention carbon black is incorporated in the walls of such capsules in a manner and in a quantity whereby it achieves the desired object of rendering the walls opaque and whereby the carbon black is compatible with the capsule walls and the integrity of the capsule.

I have found that carbon black of various types (e.g., from different sources and in a large range of particle sizes) can be successfully incorporated in the walls of such capsules by observing certain conditions, as explained hereinafter.

As a preliminary step in the practice of my invention, an aqueous solution of a negative colloid or polymer is prepared which is suitable for admixture with a positive polymer or colloid to form a potential coacervate system, i.e., a system which upon altering a property such as pH, temperature or concentration will form a coacervate. By "positive" or "negative" polymer is meant a polymer which, under the conditions of coacervation is positive or negative. Many such polymers are amphoteric and contain both acidic and basic groups, hence can be either positive or negative depending on the pH.

The two reactant polymers are selected to be capable of forming a coacervate which will encapsulate droplets of oil dispersed in the system. The selected negative polymer is preferably one which has a high charge density, for example, ethylene-maleic anhydride copolymer (in hydrolysed form) hereinafter referred to as EMA, which has an acid equivalent typically about 12 milliequivalents (meq.) per gram; polyvinylmethyl ether-maleic anhydride copolymer (hereinafter referred to as PVMMA), which has an acid equivalent typically about 8 meq. per gram; and carragenan, which has an acid equivalent typically about 3 to 4 meq. per gram. However, negative polymers having a much lower acid equivalent, therefore a much lower charge density, may be used. For example, gun arabic, which has an acid equivalent of about 0.07 meg. per gram may be used if the carbon black particles are larger.

Carbon black is dispersed in the solution of negative polymers. I have found that the amount of carbon black incorporated in the solution of negative polymer is important with respect to retention of internal phase in the ultimate capsules as well as the degree of opacity imparted to the capsule walls. I have found that if an excessive quantity of carbon black is added, the capsules leak the internal phase, i.e., retention of internal phase is poor. On the other hand, too little of the carbon black may be inadequate to achieve the desired degree of opacity. I have also found that the covering power of carbon black, i.e., its capacity to render the capsule walls opaque, is a function not only of the amount (whether by weight of volume), of carbon black but it is also a function of particle size. I have found that carbon black of small particle diameter is more effective on a weight basis than carbon black of large particle diameter to render capsule walls opaque. This is illustrated by Example 3 and Table II below.

In any case, by a process of reasonable trial and error one can determine the optimum amount of carbon black which will not detract from retention of the internal phase but which will impart the desired opacity to the capsule walls. This optimum amount may lie within a rather narrow range but it is not difficult to ascertain.

A solution of the selected positive polymer is also prepared. The positive polymer may be any one of several which is capable of forming a coacervate with the selected negative polymer. Examples of suitable positive polymers are gelatin, polyethylene imine, polyvinyl alcohol, etc. Gelatin is preferred.

The internal phase is dispersed in one or the other of these solutions or in a mixture of the two solutions after they have been mixed but before coacervation is brought about.

Coacervation is then brought about by any suitable means such as adjustment of pH, cooling, dilution, etc. Further processing steps such as cooling and/or treatment of the capsules with formaldehyde to toughen the capsule walls and make them less pervious, may be carried out in a manner known in the art.

By this means, capsules are formed in which the internal phase is encapsulated, the walls of the capsules are of good quality and retain the internal phase and the walls are opaque.

The following specific examples will illustrate the practice and advantages of the invention.

Example 1

A 1% aqueous solution of an ethylene-maleic anhydride copolymer (EMA) in hydrolyzed form was prepared. The EMA selected was a low viscosity, low molecular weight polymer. The pH was adjusted to about 9 with 20% sodium hydroxide solution. To 200 parts by weight of this solution were added 4 parts by weight of gas furnace black and the mixture was stirred in a Waring Blendor. The gas furnace black was Cabot Corporation's Sterling R. See Table I below for further data concerning this carbon black.

This solution may be used as the second sol in the system shown in FIG. 5 of the Green patent, the first sol being typically a 1% aqueous solution of high isoelectric point gelatin. The material which it is desired to encapsulate is dispersed in the first sol. The procedure of said FIG. 5 is followed to bring about coacervation, encapsulation, and treatment of the capsules.

Example 2

A 0.6% aqueous solution of carrageenan is prepared at 50° C., and its pH is adjusted to 6.5. 640 parts by weight of this solution are mixed with 2 parts by weight of gas furnace carbon black (same as Example 1) in a Waring Blendor. This solution is added dropwise to a solution of 40 parts by weight of high isoelectric point gelatin in 2500 parts by weight of distilled water and 80 parts by weight of 80% sorbitol adjusted to a pH of 6.5. Temperature is maintained at 50° C. After about half the carrageenan solution-carbon black dispersion has been added, 180 parts by weight of vitamin oil are added and the mixture may be stirred to produce the desired particle size. Then the remainder of the carrageenan-carbon black dispersion is added to the gelatin solution and the system is allowed to cool to room temperature. It is then chilled to below 10° C. with an ice bath and 20 parts by weight of 25% glutaraldehyde are added, the latter as a curing agent to cure and toughen the coating on the capsules. The system is allowed to stand over night and to warm to room temperature with stirring. The capsules can be washed and dried in the usual manner.

The products of Examples 1 and 2 consist of capsules containing a core or internal phase of the material which it is desired to encapsulate and a coating of the usual kind produced by coacervation but with the added feature that the walls are opaque and conceal the internal phase and prevent or greatly diminish the penetration of sunlight to the internal phase.

Example 3

Several carbon blacks representing different processes of manufacture and different properties and particle size were employed. These carbon blacks are set forth in Table I below.

TABLE I

| Trade name of carbon black (all Cabot Corp.) | Type of carbon black | pH | Volatiles | Diameter in millimicrons |
|---|---|---|---|---|
| (1) Sterling R | Gas furnace | 8.5 | 1.0 | 75 |
| (2) Vulcan XC-72 | Conductive oil furnace | 7.5 | 2.0 | 30 |
| (3) Regal 400 R | Medium flow furnace | 4.5 | 2.5 | 25 |
| (4) Mogul L/V | Long flow furnace | 3.4 | 5.0 | 24 |
| (5) Mogul A | do | 3.5 | 12.0 | 28 |
| (6) Elf 8 | Regular color channel | 4.5 | 5.0 | 27 |
| (7) Carbolac 2 | High color channel | 3.0 | 13.0 | 12 |
| (8) Sterling MT | Thermal | 9.5 | 0.5 | 250 |

A 1% aqueous solution of EMA was prepared, the EMA being a mixture of two different molecular weights on the low molecular weight side. The pH was adjusted to 9.0. To 100 ml. batches of this solution was added carbon black in the amounts shown in Table II. The carbon black was dispersed in each batch, using a Waring Blendor. A 1.5% aqueous solution of pigskin gelatin was also prepared. The internal phase was dioctyl phthalate in which was dissolved Fluorol 7GA (a dyestuff that fluoresces under ultraviolet light). To a quantity of gelatin solution containing 20 grams of gelatin was added a solution of 20 grams of gum arabic dissolved in 160 ml. of water, and 180 ml. of the internal phase was then dispersed to give droplets 2 to 4 mm. in diameter. One batch of EMA solution containing carbon black was then added. The temperature was 45° C. Coacervation and encapsulation were carried out by adjusting the pH to 6.5 and allowing the system to cool to room temperature. It was then placed in an ice bath, and the temperature lowered to below 10° C. The pH was lowered to 4.5 with 14% acetic acid, and 10 ml. of 25% aqueous glutaraldehyde was added to harden the capsule wall and render it insoluble in water. The capsules were then washed in water and dried.

Results are summarized in Table II. Opacity was judged by examination of capsules under ultraviolet light. Retention of internal phase was judged by the amount of dioctylphthalate released by the capsules after storage under ambient conditions.

TABLE II

| Carbon black | Amount of carbon black | Opacity | Retention of internal phase |
|---|---|---|---|
| 1 | 2 grams | Adequate | Poor. |
|  | do | do | Do. |
|  | do | do | Do. |
|  | 1.00 grams | do | Excellent. |
| 2 | 2 grams | do | Poor. |
|  | 0.04 grams | do | Excellent. |
| 3 | 2 grams | do | Poor. |
|  | 0.33 grams | Not adequate | Excellent. |
| 4 | 2 grams | Adequate | Poor. |
|  | 0.32 grams | do | Excellent. |
| 5 | 2 grams | do | Poor. |
|  | 0.37 grams | do | Excellent. |
| 6 | 2 grams | do | Poor. |
|  | 0.36 grams | do | Excellent. |
| 7 | 2 grams | do | Poor. |
|  | 0.16 grams | Not adequate | Excellent. |
| 8 | 2 grams | Adequate | Poor. |
|  | 1.00 grams | do | Excellent. |

As will be seen, the larger amounts (2 grams) of carbon black provided adequate opacity but poor retention of internal phase. Sterling R (No. 1) provided adequate opacity and excellent retention at 1 gram and Mogul L/V (No. 4) provided adequate opacity and excellent retention at 0.32 gram. Note that the particle size of No. 4 (24 mµ) was one-third that of No. 1 (75 mµ). In general, where carbon black of small particle size is used it can and should be used in lesser amount (by weight) than a carbon black of larger particle size.

It will therefore be apparent that a process has been provided for encapsulating by coacervation materials which are light sensitive, or whose color or identity it is desired to conceal and to render the walls of the capsules opaque without detriment to the capsules, e.g., to the permeability of the capsule walls and retention of the internal phase.

I claim:

1. A method of producing capsules having opaque walls encapsulating an internal phase, said walls being formed by coacervation from an aqueous solution of a negative polymer and a positive polymer in which the internal phase is dispersed as an insoluble component, said method comprising:
    (a) providing a dispersion of carbon black in an aqueous solution of a negative polymer;
    (b) admixing an aqueous solution of a positive polymer with said carbon black-containing negative polymer solution,
    (c) providing a dispersion of an internal phase in the resulting admixture of said polymer solutions at a stage prior to completion of coacervation, said internal phase being dispersed in one or the other of the two polymer solutions or in said admixture of above step (b), and
    (d) causing coacervation of said polymers in said admixture and encapsulation of said internal phase within walls containing said carbon black, the quantity of carbon black in above step (a) being selected to render said capsule walls opaque and to provide capsule walls which retain the internal phase.

2. The method of claim 1 wherein the negative polymer has a charge density corresponding to an acid equivalent not less than about one milli-equivalent of acid per gram.

3. The method of claim 2 wherein the negative polymer is hydrolyzed ethylene-maleic anhydride copolymer.

4. The method of claim 2 wherein the negative polymer is polyvinylmethyl ether-maleic anhydride copolymer.

5. The method of claim 2 wherein the negative polymer is carrageenan.

6. The method of claim 1 wherein the positive polymer is gelatin.

7. The method of claim 3 wherein the positive polymer is gelatin.

8. The method of claim 4 wherein the positive polymer is gelatin.

9. The method of claim 5 wherein the positive polymer is gelatin.

References Cited

UNITED STATES PATENTS

| | | | |
|---|---|---|---|
| 2,800,457 | 7/1957 | Green et al. | 252—316 |
| 3,016,308 | 1/1962 | Macaulay | 117—36.7 |
| 3,338,991 | 8/1967 | Insalaco | 264—7 |

ROBERT F. WHITE, Primary Examiner

J. R. HALL, Assistant Examiner

U.S. Cl. X.R.

264—4